United States Patent [19]
Ueda

[11] 3,845,776
[45] Nov. 5, 1974

[54] UNLOADER VALVE
[75] Inventor: Atsumi Ueda, Toyota, Japan
[73] Assignee: Aisin Seiki Kabushiki Kaisha, Kariya-shi, Aichi-ken, Japan
[22] Filed: Dec. 20, 1972
[21] Appl. No.: 316,819

[30] Foreign Application Priority Data
Dec. 24, 1972 Japan.................................. 47-3524
Sept. 22, 1972 Japan.............................. 47-95394

[52] U.S. Cl. ............................................. 137/116
[51] Int. Cl. ......................................... G05d 16/10
[58] Field of Search....................... 137/116; 60/418

[56] References Cited
UNITED STATES PATENTS
| | | | |
|---|---|---|---|
| 2,395,941 | 3/1946 | Rockwell............................ | 137/116 |
| 2,429,489 | 10/1947 | Roth.................................. | 137/116 |
| 2,487,575 | 11/1949 | Mercier.............................. | 137/116 |
| 2,490,510 | 12/1949 | Carleton............................. | 137/116 |
| 3,602,243 | 8/1971 | Holt.............................. | 137/116 UX |
| R23,682 | 7/1953 | Stevenson.......................... | 137/116 |

FOREIGN PATENTS OR APPLICATIONS
1,224,577 9/1966 Germany.......................... 137/116

Primary Examiner—Robert G. Nilson
Attorney, Agent, or Firm—Moonray Kojima

[57] ABSTRACT

An unloader valve disposed within a hydraulic circuit connecting a hydraulic pressure source to an accumulator for an actuator. The unloader valve comprises a ball valve for controlling pressurized fluid supplied into the accumulator from the pressure source and a valve spool for regulating the open-and-close operation of the ball valve in response to the pressure accumulated within the accumulator.

9 Claims, 10 Drawing Figures 3,845,776

1

UNLOADER VALVE

BACKGROUND OF THE INVENTION

The present invention relates to an unloader valve, and more particularly to a novel improvement of the unloader valve disposed within a hydraulic circuit connecting a hydraulic pressure source with an accumulator for such an actuator as a hydraulic power brake of a vehicle and the like. The unloader valve functions to drain the pressurized fluid discharged from a fluid pump after completion of pressure accumulation within the accumulator up to a predetermined maximum valve and to activate accumulation of the pressurized fluid into the accumulator upon the decrease of the accumulated pressure valve within the accumulator down to a predetermined minimum value.

SUMMARY OF THE INVENTION

An object of the present invention is, therefore, to provide an unloader valve of the above-mentioned type, wherein a ball valve is adapted for controlling pressure from a hydraulic pressure source to an accumulator and is operated by a valve spool in response with the pressure accumulated within the accumulator, thereby to effect precise and stable operation and to increase durability of the device.

Another object of the present invention is to provide an unloader valve, having the above-mentioned characteristics, wherein in need of pressure accumulation into the accumulator, the valve spool is swiftly operated to effect the pressure accumulating operation.

Still another object of the present invention is to provide an unloader valve, having the above-mentioned characteristics, wherein pressure accumulating operation can be realized selectively covering a plurality of accumulators. Furthermore, it will not disturb the whole operation that any one of the accumulators goes out of order.

A further object of the present invention is to provide an unloader valve, having the above-mentioned characteristics, wherein the ball valve is designed and positioned to be precisely controlled by the valve spool.

According to the present invention briefly summarized, there is provided an unloader valve which comprises a housing provided therein with a first pressure chamber interposed between a hydraulic pressure source and an accumulator and a second pressure chamber connected with a reservoir, and a ball valve for opening and closing the communication between the first and second pressure chambers. The unloader valve further includes a support member hermetically inserted within the interior of the housing and forming the first pressure chamber at one side thereof and a third pressure chamber connected with the accumulator at the other side thereof; a valve spool for controlling the open-and-close operation of the ball valve and including a small diameter portion axially slidably engaged within the support member and a large diameter portion exposed within the first pressure chamber, the small diameter portion extending integrally from the large diameter portion, being larger in diameter than a valve seat of the ball valve, and being exposed in the third chamber at its one end; a ball housed within the third pressure chamber and biased toward the end of the small diameter portion of the valve spool by pressure accumulated within the accumulator; and a ball receiver for receiving the ball thereon and formed at the end face of the support member within the third pressure chamber, the ball receiver having a larger diameter than that of the small diameter portion of the valve spool.

BRIEF DESCRIPTION OF THE DRAWINGS

Additional objects and advantages of the present invention will be more readily apparent from the following detailed description of embodiments thereof when taken together with the accompanying drawings in which.

DESCRIPTION OF THE PREFERRED EMBODIMENTS

Figure 1:
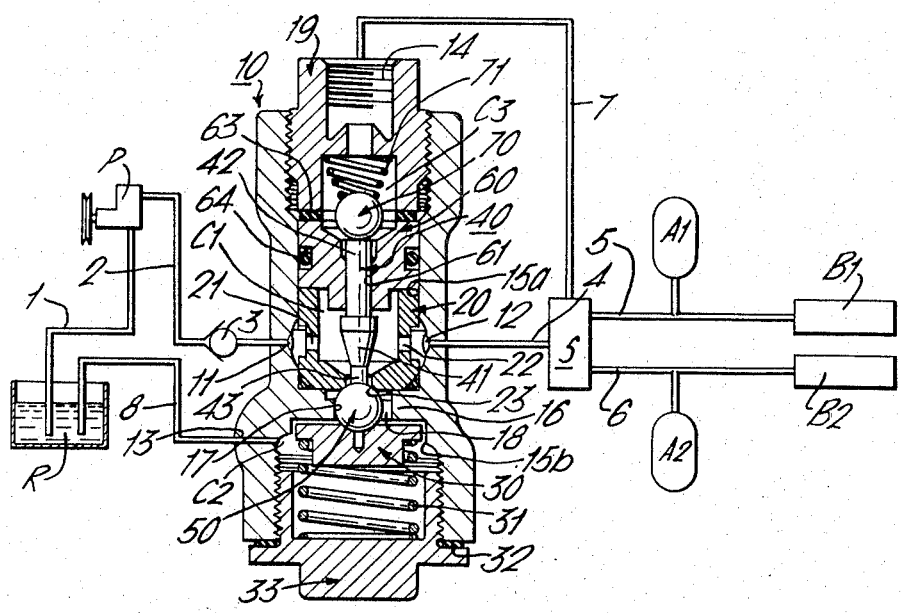
FIG. 1 shows an elevational cross-sectional view of a preferred embodiment of an unloader valve in accordance with the present invention.

Referring more particularly to the drawings, in FIG. 1 there is shown an unloader valve comprising a housing 10 provided with a first port 11 in connection to a fluid pump P by way of a conduit 2 through a check valve 3 and with the second port 12 which is connected to a safety valve S through a conduit 4. The pump P is connected to a fluid reservoir R by way of a conduit 1. The safety valve S is in connection with conduits 5 and 6 respectively extending to accumulators $A_1$ and $A_2$ which are connected to respective actuators $B_1$ and $B_2$. A drain port 13 drilled through the housing 10 is connected with the reservoir R through a conduit 8.

The housing 10 is further provided with a cylindrical bore therein which is divided into an upper cylindrical bore 15a and a lower cylindrical bore 15b by way of a partition wall 16 which has a center guide hole 17. The bottom end of the lower cylindrical bore 15b is hermetically closed with an annular plug 33 threaded therein through a sealing member 32, thereby formed between the plug 33 and the partition wall 16 is a second pressure chamber $C_2$ which is in connection with the drain port 13. A holder 30 is vertically movable within the second pressure chamber $C_2$ to hold a ball 50 which is vertically movable in the center guide hold 17, the holder 30 being normally biased upward in the figure by a compression coil spring 31, one end of which is secured on the inside wall of the plug 33.

Within the upper cylindrical bore 15a, a seat member 20 and a support member 60 are hermetically inserted and placed in the predetermined positions through a sealing member 63 by way of an annular plug 19 threaded in the top end portion of the housing 10. The plug 19 is provided therein with a third port 14 which is connected to the safety valve S through a conduit 7.

The seat member 20 is provided with radial holes 21 and 22 therethrough, the holes 21 and 22 being connected respectively with the first and second ports 11 and 12 of the housing 10. The bottom face of the seat member 20 forms a valve seat 23 for the ball 50 and the interior of the seat member 20 forms a first pressure chamber $C_1$ below the bottom face of the support member 60. The support member 60 has an axial center hole 61 drilled therethrough and concentrically aligned with the hole of the valve seat 23. The diameter of the axial center hole 61 is larger than that of the hole of the valve seat 23. A valve seat 62 (see FIGS. 4 to 6) is provided on the upper face of the support member 60, which has a larger diameter than that of the axial center hole 61. A third pressure chamber $C_3$ is formed between the support member 60 and the plug 19, wherein installed is a ball 70 to be received on the valve seat 62 and normally biased downward in the figure by a spring 71.

A valve spool 40 is designed to have a small diameter portion 42 snugly and slidably engaged within the axial center hole 61 and a large diameter portion 41 exposed within the first pressure chamber $C_1$. The ball 70 is normally in contact with the upper end face of the small diameter portion 42 of the valve spool 40 by resilient force of the spring 71 and the ball 50 is normally in contact with the bottom face of the lower end portion 43 of the valve spool 40.

When the ball 50 separates from the valve seat 23, the first pressure chamber $C_1$ is communicated to the second pressure chamber $C_2$ constantly open to the drain port 13 by way of a groove 18 axially drilled on the interior wall of the axial guide hole 17 of the partition wall 16.

Figure 2:
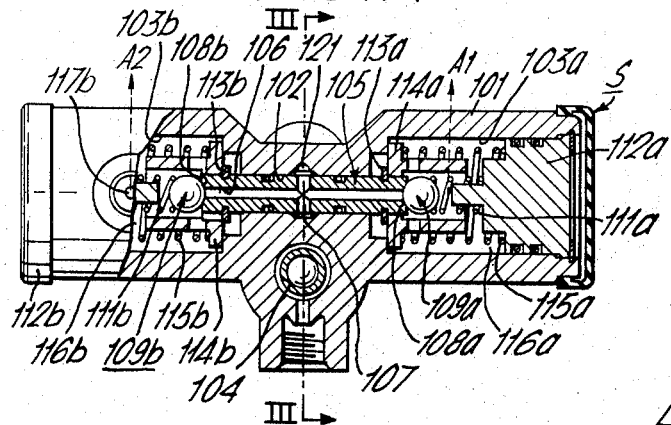
FIG. 2 is an elevational cross-sectional view of a safety valve shown diagrammatically in FIG. 1.
Figure 3:
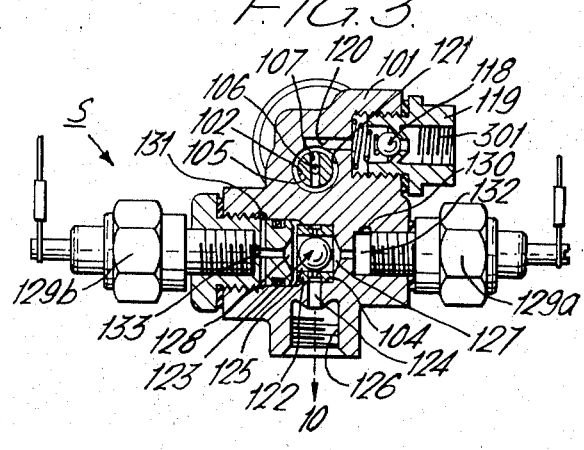
FIG. 3 depicts a sectional view taken along III — III line of FIG. 2.

Described in detail below with reference to the FIGS. 2 and 3 is the safety valve S which comprises a housing 101 provided therein with a small diameter cylindrical bore 102 at the center portion and a pair of large diameter cylindrical bores 103a and 103b respectively at the right and left sides of the small diameter cylindrical bore 102. The housing 101 further includes therein a cylindrical bore 104 positioned transversely below the axial line of the bores 103a, 103b and connected with these bores 103a and 103b by way of passageways not shown in the figure. The open ends of the large diameter bores 103a and 103b are closed respectively with stepped plugs 112a and 112b in hermetical engagement therewith. Thus, constructed are pressure chambers 116a and 116b respectively in the large diameter bores 103a and 103b. Outlet ports 117a and 117b are transversely drilled on the housing 101 so as to respectively connect the pressure chambers 116a and 116b with the accumulators $A_1$ and $A_2$ (FIG. 1) through the conduits 5 and 6.

A piston 105 engages slidably within the small diameter cylindrical bore 102 and is normally regulated not to make its axial movements by way of compression springs 115a and 115b through snap rings 113a and 113b and supporters 114a and 114b. The spring 115a is interposed between the supporter 114a and the plug 112a within the large diameter cylindrical bore 103a and the spring 115b between the supporter 114b and the plug 112b within the large diameter cylindrical bore 103b. The piston 105 is provided with an axial center passage 106 therethrough and a radial or vertical passage 107 at the central portion thereof. A pair of valve seats 108a and 108b are formed respectively at the right and left ends of the axial center passage 106 to receive thereon balls 109a and 109b. The balls 109a and 109b are normally biased onto the valve seats 108a and 108b by way of springs 111a and 111b which are secured respectively on the plugs 112a and 112b at one end thereof.

Now reference is made particularly to FIG. 3; an inlet port 301 is drilled through a plug 119 which is threaded in the housing 101 and includes therein a check valve 118. This inlet port 301 is in connection with an annular chamber 121 located at the central portion of the small diameter cylindrical bore 102 through a passage 120. A cylindrical insert member 122 is pressed into the cylindrical bore 104 and a ball 123 is inserted into the insert member 122, the diameter of the ball 123 being slightly smaller than that of the interior of the insert member 122. A radial passage 124 is provided at the axial central portion of the insert member 122. One end of the radial passage 124 opens to an interior chamber 125 of the insert member 122 and the other end opens to an outlet port 126 which is connected to the third port 14 of the valve housing 10 through the conduit 7. A pair of valve seats 127 and 128 are formed respectively at the both sides of the insert member 122 and these valve seats 127 and 128 are respectively in connection with chambers 132 and 133 which are in turn in repective connection with the chambers 116a and 116b through passages 130 and 131. The chambers 132 and 133 are respectively formed on the inside faces of the plugs 129a and 129b threaded in the housing 101.

With the safety valve S as described above, when pressurized fluid is delivered into the inlet port 301 through the second port 12 of the unloader valve and the conduit 4, the fluid opens the check valve 118 to flow into the pressure chambers 116a and 116b through the passage 120, the annular chamber 121, the passage 107 and the passage 106. The pressurized fluid is then led into the accumulators $A_1$ and $A_2$ and accumulated therein through the outlet ports 117a and 117b, the conduit 5 and the conduit 6. When there is a pressure difference between the accumulators $A_1$ and $A_2$, the pressure value either within the chambers 132 or 133 exceeds that within the other so as to let the ball 123 in the insert member 122 seat on either of the valve seat 127 or 128. This causes the higher pressure to flow into the third pressure chamber $C_3$ of the valve housing 10 through the outlet port 126 and the conduit 7 to become a pilot pressure within the unloader valve.

Described below is the functions of the unloader valve constructed as mentioned above. When the pressure value within the accumulators $A_1$ and $A_2$ decreases to be lower than a predetermined minimum value by use of the actuators $B_1$ and $B_2$, the ball 50 sits on the valve seat 23 by action of the spring 31 so as to block the communication between the first and second pressure chambers $C_1$ and $C_2$ as best illustrated in FIG. 4.

Consequentially, the fluid pressure discharged from the pump P is increased in value and accumulated in the accumulators $A_1$ and $A_2$ through the safety valve S.

Figure 4:
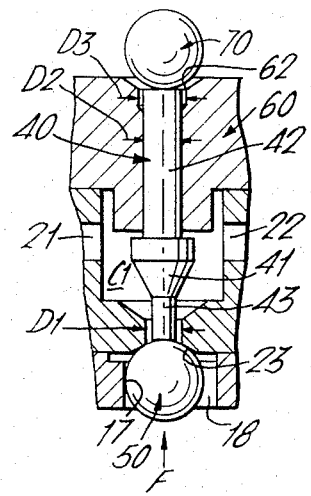
FIG. 4 is a partially enlarged sectional view of FIG. 1 while pressure is sufficiently accumulated within the accumulators shown in FIG. 1.

When the pressure value within the first chamber $C_1$ reaches a predetermined maximum one represented by $P_1$ due to the accumulating operation of the accumulators $A_1$ and $A_2$, effected is a formula, $P_1 \cdot D_1 = F$ under conditions, $P_1$ = the predetermined maximum value of the pressure accumulated within the accumulators $A_1$ and $A_2$, $D_1$ = the cross-sectional area of the valve seat 23, and $F$ = the setting load of the spring 31 when conditioned as in FIG. 4.

Figure 5:
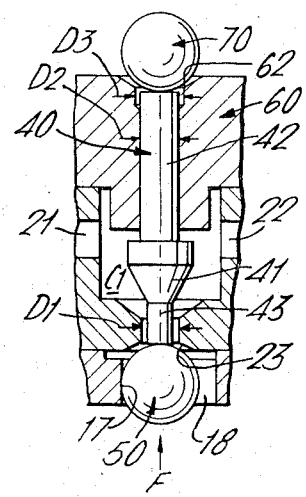
FIG. 5 shows the same view as FIG. 4, indicating the initial operation step of the unloader valve.

Thus, the ball 50 starts to move slightly downward together with the valve spool 40 so as to connect the first pressure chamber $C_1$ with the second pressure chamber $C_2$ through the passage 18 as well illustrated in FIG. 5. At this moment, the pressure value of the accumulators $A_1$ and $A_2$ which is represented by $P_2$ can be explained with a formula $P_2 \approx P_1$ (i.e., $P_2$ is approximately $P_1$)

When the state shown in FIG. 5 is completed, the pressure within the first pressure chamber $C_1$ starts decreasing in value. And the spring 31 is urged by a force explained with $P_2 \cdot D_2$, this state being well explained by a formula, $P_2 \cdot D_2 > F + K_1 \cdot X_1$ under additional conditions, $D_2$ = the cross sectional area of the small diameter portion 42 of the valve spool 40, $K_1$ = a resilient constant of the spring 31, and $X_1$ = the displacement amount of the valve spool 40 from the position in FIG. 4 to the position in FIG. 5.

Figure 6:
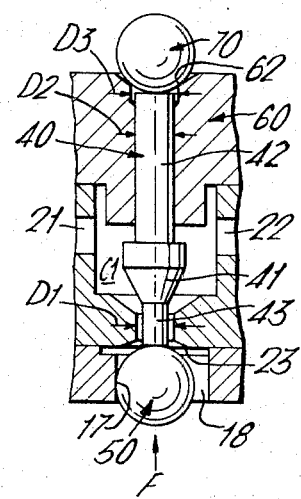
FIG. 6 shows the same view as FIG. 4, indicating the step when the unloader valve operation is completed.

This indicates that the valve spool 40 moves further downward to the position as shown in FIG. 6, and effected is a formula, $P_2 \cdot D_3 > F + K_1 \cdot X_2$ under further additional conditions, $D_3$ = the cross-sectional area of the valve seat 62, and $X_2$ = the displacement amount of the valve spool 40 from the position in FIG. 4 to the position in FIG. 6.

Thus, the ball 70 sits on the valve seat 62 and the pressure fluid from the pump P returns to the reservoir R through the first pressure chamber $C_1$, the passage 18, the second pressure chamber $C_2$, the drain port 13 and the conduit 8.

Now under the state as shown in FIG. 6, when the use of the actuators $B_1$ and $B_2$ makes the pressure value $P_2$ of the accumulators $A_1$ and $A_2$ decreased below, $P_2 = (F + K_1 \cdot X_2) / D_3$ the pressure balance is lost between the pressure acting on the spool 40 and the action of the spring 31 so as to let the ball 70 separate from the valve seat 62. And the pressure of the accumulators $A_1$ and $A_2$ are added onto the cross-sectional area $D_2$ of the small diameter portion 42 of the valve spool 40 to effect an inequality, $P_2 \cdot D_2 < F + K_1 \cdot x_2$ which means a swift upward movement of the valve spool 40 to get back to the position as shown in FIG. 4. Consequentially, the communication between the first and second pressure chambers $C_1$ and $C_2$ is blocked to increase the fluid pressure discharged from the pump P so that the pressure can be accumulated within the accumulators $A_1$ and $A_2$ through the safety valve S.

In the described preferred embodiment, the spring 71 biases the ball 70 downward: when the resilient constant $K_2$ of the spring 71 is determined in respect with the resilient constant $K_1$ of the spring 31 so as to effect an inequality, $K_2 << K_1$, the actual resilient force F of the spring 31 may be measured to be less than the setting load of the spring 71.

Although in this preferred embodiment the accumulating operation of the two accumulators $A_1$ and $A_2$ can selectively be controlled by the safety valve S, in controlling one accumulator, the safety valve S may be unnecessary.

Figure 7:
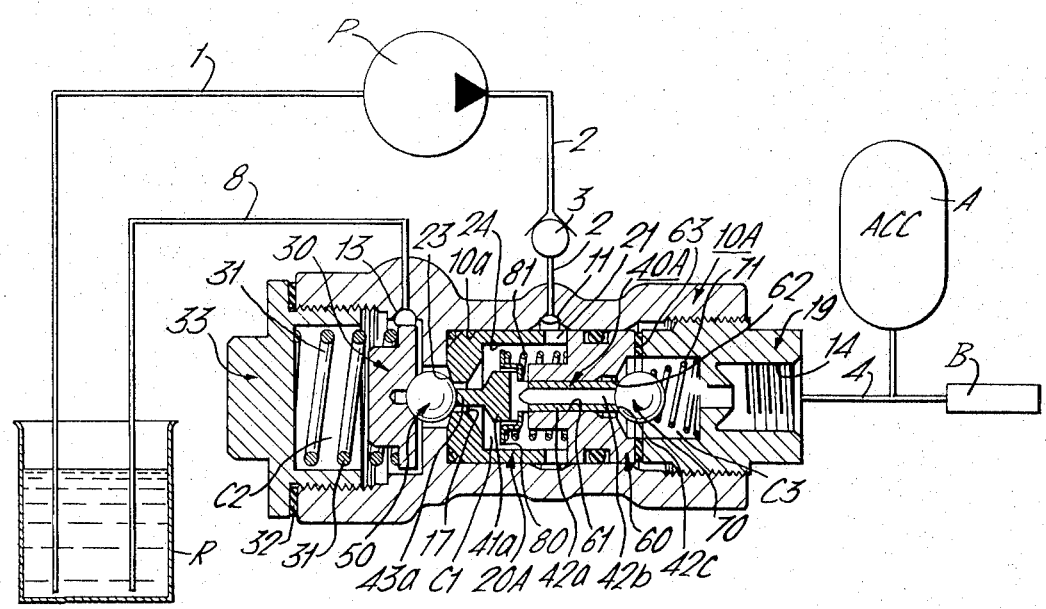
FIG. 7 shows an elevational cross-sectional view of a second preferred embodiment of an unloader valve in accordance with the present invention.

Described below is a second preferred embodiment of an unloader valve in accordance with the present invention in reference with FIG. 7. The construction of this second embodiment is substantially same as that of the first preferred embodiment and the same or similar reference numerals indicate the same or similar component parts and portions. The differences in this second embodiment from the first one are represented by provision of an axial passage 42b drilled through a small diameter portion 42a and a return spring 81 interposed between the support member 60 and a retainer 80 secured on the shoulder portion of the large diameter portion 41a of the spool 40A. Thus, eliminated is the port 12 for connecting the first pressure chamber $C_1$ with the third pressure chamber $C_3$ through the safety valve S and the conduits 4 and 7 in the first preferred embodiment. The reference numerals 40A, 41a, 42a and 43a indicate the corresponding parts and portions 40, 41, 42 and 43 in the first preferred embodiment.

Figure 8:
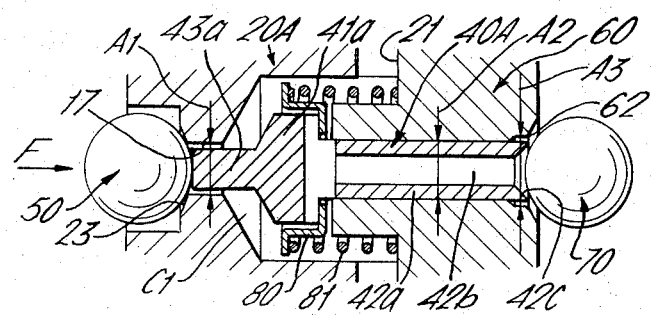
FIG. 8 depicts a partial enlarged sectional view of FIG. 7 while pressure is sufficiently accumulated in the accumulator.

Described below are the functions of the unloader valve of the second preferred embodiment. When the pressure value of an accumulator A is reduced below a predetermined minimum one by use of an actuator B, the ball 50 sits on the valve seat 23 by way of the resilient force of the spring 31 so as to block the communication between the first and second pressure chambers $C_1$ and $C_2$ as shown in FIG. 8. Thus, the pressure discharged from the pump P is increased in value to separate the ball 70 from the valve seat 62 against the resilient force of the spring 71 and accumulated within the accumulator A. When the pressure within the accumulator A reaches a predetermined maximum value $P_1$, effected is an equality, $P_1 = F / A_1$ under conditions, $P_1$ = the predetermined maximum value of the pressure accumulated within the accumulator A, $F$ = the setting load of the spring 31 in the state as shown in FIG. 8, and $A_1$ = the cross-sectional area of the valve seat 23.

Then, the pressure balance is lost and the spool 40A makes a slight leftward displacement in the figure. This state is well illustrated in FIG. 9, and the pressure of the accumulator A is represented by $P_2$ in respect with an equality, $P_2 = (F + K_1 \cdot X_1) / A_1$ under additional conditions, $K_1$ = the resilient constant of the spring 31, and $X_1$ = the displacement amount of the spool 40A from the position in FIG. 8 to the position in FIG. 9.

Then, further displacement of the spool 40a effects the following inequality, $$P_2 \cdot A_2 > F + K_1 \cdot X_1$$

under a further additional condition, $A_2$ = the cross-sectional area of the small diameter portion 42a of the spool 40A.

Figure 10:
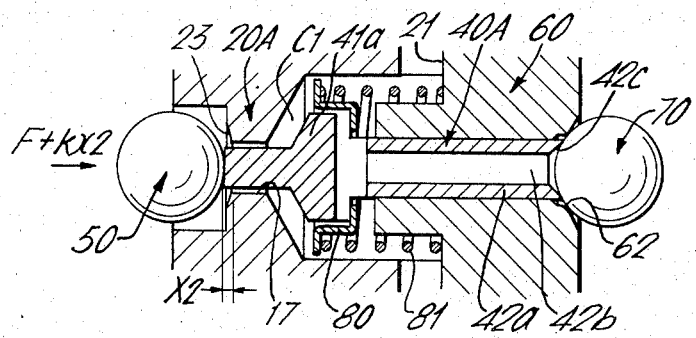
FIG. 10 shows the same view as in FIG. 8, showing the step when the pump is being operated with no load.

Now the small diameter portion 42a of the spool 40A is conditioned to the position as shown in FIG. 10 so that the ball 70 sits on the valve seat 62. And the pressure fluid discharged from the pump P returns to the reservoir R through the axial hole 17 of the valve seat 23.

Under the condition as shown in FIG. 10, the use of the actuator B decreases the pressure within the accumulator A to effect the following equality, the accumulator pressure at this time being represented by $P_3$, $$P_3 = (F + K_1 \cdot x_2) / A_3$$

under another condition, $A_3$ = the cross-sectional area of the valve seat 62.

Figure 9:
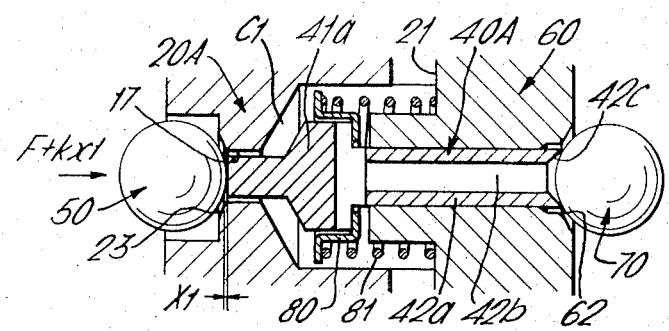
FIG. 9 illustrates the same view as FIG. 8, indicating a switch-over operation.

Consequentially, the pressure balance is lost and the ball 70 separates from the valve seat 62 and the pressure of the accumulator A acts on the cross-sectional area $A_2$ of the small diameter portion 42a of the spool 40A. This effects an inequality of $F + K_1 \cdot X_2 > P_3 \cdot A_2$. Thus, the spool 40A makes its rightward displacement in the figure to be conditioned to the position as shown in FIG. 8 through the position as shown in FIG. 9. In the above-mentioned process, it should be clearly observed that in FIG. 10, hydraulic pressure acting area corresponds with that of the valve seat 62 and in FIG. 9, the pressure acting area corresponds with that of the small diameter portion 42a of the valve spool 40A. Thus, the rightward displacement of the valve spool 40A is swiftly effected and the valve spool 40A makes its quick return to the position as shown in FIG. 8. And the pressure discharged from pump P is increased in value to urge the ball 70 and accumulated in the accumulator A.

As shown in FIGS. 8, 9 and 10, the spring 81 normally has leftward biasing force. When the resilient constant $K_2$ of the spring 81 is determined in respect with the resilient constant $K_1$ of the spring 31 to effect an inquality $K_2 << K_1$, the actual baising force $F$ of the spring 31 will be less by the setting load of the spring 81.

The main purpose of the adaptation of the spring 81 is to secure constant contact of the end portion 43a of the spool 40A with the ball 50 and to secure integral operation of the spool 40A and the ball 50. It should be very clear now that in this second preferred embodiment, the predetermined maximum pressure value and the predetermined minimum pressure value of the accumulator A are represented by $P_2$ and $P_3$ respectively, in this instance, the time necessary in switching-over the condition from the one shown in FIG. 8 to the one shown in FIG. 9 is very small so that an equality of ($P_2 \approx P_1$) can be effected. And the displacement amount of the spool 40A is expressed as ($X_2 - X_1$). The change of the biasing force of the spring 81 during the mentioned displacement of the spool 40A is, $K_1 \cdot (X_2 - X_1)$. For accurate operation of the balls 50 and 70, the following inequalities should be fulfilled, $$K_1(X_2 - X_1) < (A_2 - A_3)P_2, \text{ and}$$
$$K_1(X_2 - X_1) < (A_1 - A_2)P_3.$$

Thus, the smaller ($X_2 - X_1$) is, the bigger $K_1$ can be. In other words, designing of the springs can be easier and the springs can be smaller in size.

In the above construction, it should be noted that the amount of ($X_2 - X_1$) can be considarably smaller so as to ignore conduit resistance against the pump. This effects well the feature of this invention that the operation becomes secured more and more in accordance with the larger differences in the above-mentioned inequalities.

Having now fully set forth both structure and operation of preferred embodiments of the concept underlying the present invention, various other embodiments as well as certain variations and modifications of the embodiments herein shown and described will obviously occur to those skilled in the art upon becoming familiar with said underlying concept. It is to be understood, therefore, that within the scope of the appended claims, the invention may be practiced otherwise than as specifically set forth herein.

What is claimed is:

1. In an unloader valve for hydraulically controlled systems having a hydraulic circuit connecting a hydraulic pressure source with an accumulator for an actuator, comprising a housing provided therein with a first pressure chamber interposed between said pressure source and said accumulator and a second pressure chamber connected with a reservoir;

a ball valve for opening and closing the communication between said first and second pressure chambers;

a support member hermetically inserted within the interior of said housing and forming said first pressure chamber at one side thereof and a third pressure chamber at the other side thereof, said third pressure chamber being connected with said accumulator;

a valve spool for controlling the open-and-close operation of said ball valve and including a small diameter portion axially slidably engaged within the said support member and a large diameter portion exposed in said first pressure chamber, said small diameter portion extending integrally from said large diameter portion, being larger in diameter than a valve seat of said ball valve, and being exposed in said third chamber at its one end;

a ball housed within said third pressure chamber and biased toward said end of said small diameter portion of said valve spool by pressure accumulated within said accumulator; and a ball receiver for receiving said ball thereon and formed at the end face of said support member within said third pressure chamber, the improvement comprising said ball receiver having a larger diameter than that of said small diameter portion of said valve spool, whereby the valve spool is swiftly operated to effect pressure accumulating operation.

2. An unloader valve as claimed in claim 1, wherein said ball valve comprises a ball axially movable within an axial hole provided through a partition wall located between said first and second pressure chambers within said housing, a seat member hermetically engaged within said first pressure chamber and forming said valve seat to receive said ball thereon, a holder axially movable within said second pressure chamber to hold said ball thereon and resilient means for biasing said ball toward said valve seat through said holder, said ball being urged by said valve spool through said seat member.

3. An unloader valve as claimed in claim 2, wherein said seat member is installed between said partition wall and said support member and is positioned together with said support member by a plug threaded into said housing, said plug having a port connected to said accumulator and forming said third pressure chamber with its inner wall.

4. An unloader valve as claimed in claim 2, wherein said axial hole provided through said partition wall is aligned co-axially with said valve spool so as to guide said ball snugly therein and includes thereon an axial passage for communicating said first pressure chamber with said second pressure chamber.

5. An unloader valve as claimed in claim 1, wherein said first pressure chamber is in communication with said third pressure chamber by means of a bypass conduit connected to said accumulator through a check valve.

6. An unloader valve as claimed in claim 5, wherein resilient means is provided within said third pressure chamber to hold said ball toward said end of said small diameter portion of said valve spool.

7. An unloader valve as claimed in claim 1, wherein said valve spool includes therethrough an axial hole for connecting said first pressure chamber with said third pressure chamber, said hole being selectively closed by said ball within said third pressure chamber.

8. An unloader valve as claimed in claim 7, wherein resilient means is provided within said third pressure chamber to hold said ball toward said end of said small diameter portion of said valve spool.

9. An unloader valve as claimed in claim 1, and means for connecting said first pressure chamber to a plurality of accumulators and for connecting said accumulators selectively to said third pressure chamber in response to the pressure accumulated within said accumulators.

* * * * *